Dec. 9, 1952     M. E. GLUHAREFF     2,620,884

METAL ROTOR BLADE HAVING FLEXIBLE TRAILING EDGE

Filed Feb. 8, 1950

M. E. GLUHAREFF
INVENTOR

BY *M. B. Tasker*

ATTORNEY

Patented Dec. 9, 1952

2,620,884

UNITED STATES PATENT OFFICE 2,620,884

METAL ROTOR BLADE HAVING FLEXIBLE TRAILING EDGE

Michael E. Gluhareff, Bridgeport, Conn., assignor to United Aircraft Corporation, East Hartford, Conn., a corporation of Delaware Application February 8, 1950, Serial No. 142,988

8 Claims. (Cl. 170—159)

This invention relates to rotor blades for rotary wing aircraft and particularly to improvements in metal rotor blade having flexible trailing edge of the general type disclosed in the Sikorsky Patent No. 2,469,480.

The rotor blade of the above Sikorsky patent comprises a longitudinal integral spar member constituting the main strength member of the blade and a plurality of sheet metal shells arranged spanwise along the spar member and forming the trailing edge portion of the blade.

An object of this invention is to provide an improved construction for the sheet metal trailing edge members of the blade as well as an improved construction for securing these members to the spar member.

A further object of this invention is to provide improved means for sealing off the spaces between adjacent trailing edge members.

These and other objects and advantages of the invention will either be evident or will be pointed out in the following description of one embodiment of the invention which has been shown by way of illustration in the accompanying drawing.

In this drawing.

Certain features of the rotor blade disclosed herein are shown and claimed in a copending application of Igor I. Sikorsky, Serial No. 632,620, filed December 4, 1945, now issued as Patent No. 2,606,728 and assigned to the assignee of this application.

Figure 1:
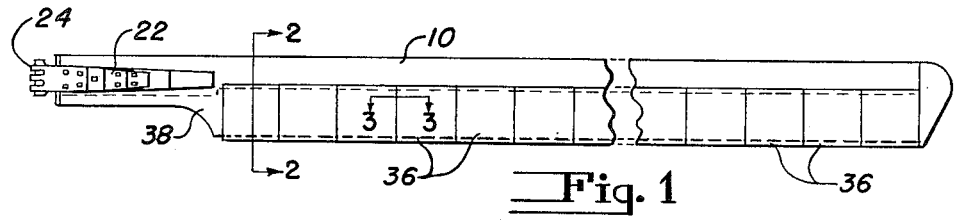
Fig. 1 is a plan view of a rotor blade embodying the invention, part of the blade being broken away to facilitate illustration.

As shown in Fig. 1, the improved rotor blade of this invention is built up of several parts including a spar member 10 forming the main strength member of the blade which also defines the airfoil contour of the leading portion of the blade. Preferably the spar member 10 is of uniform cross-section throughout its length and has one or more web-like partitions 12, 14 therein dividing the member into two or more tube-like passages 16, 18, 20 extending from end to end thereof. This structural spar member 10 may be conveniently formed by an extrusion process.

The blade is supported on the rotor drive shaft (not shown) by means of a stepped plate member 22 having a hinge member 24 by which it is attached to the blade root member on the hub, as shown in U. S. Patent No. 2,549,886 issued April 24, 1951, to Michel D. Buivid.

Figure 2:
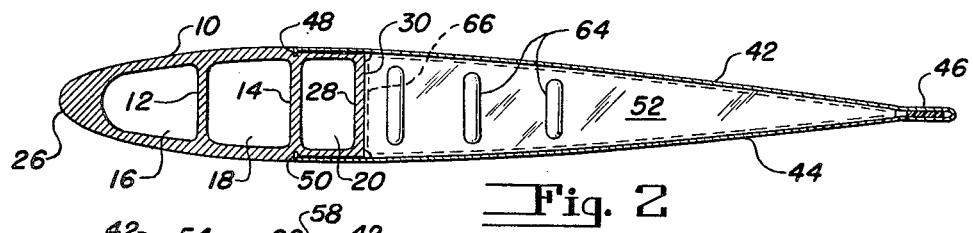
Fig. 2 is a sectional view on a much enlarged scale taken on lines 2—2 of Fig. 1.
Figure 2A:
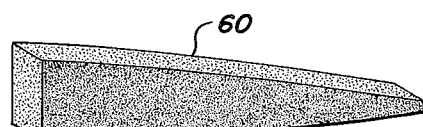
Fig. 2A is an enlarged detail view of a portion of Fig. 2.

As shown most clearly in Fig. 2, the spar member 10 has a thickened nose portion 26 and a rear closure member 28 forming a flat back surface 30 for the spar. Also the upper and lower surfaces of the spar are provided with aft cutaway attaching surfaces 32 (Fig. 2A) terminating in rearwardly facing shoulders 34 for the attachment of a series of spanwise arranged trailing edge boxes 36 hereinafter more fully described. The attaching surfaces 32, which may most conveniently be formed by a milling operation, extend from the tip end of the spar to a point adjacent the outboard end of attaching plate member 22, the trailing edge from this point to the root end of the blade being formed by a fairing member 38 which is fastened to the flat back 30 of the spar member by means of a channel which is adhesively secured to said flat back or other suitable means (not shown). Also as shown most clearly in Fig. 2A, the spar member has a kerf 40 formed in the upper and lower surfaces 32 at the shoulders 34 forming a part of the attaching means for the trailing edge boxes. These kerfs are formed without the presence of sharp corners to avoid stress concentrations in the spar member.

The trailing edge boxes 36 are identical and accordingly only one will be described in detail. These boxes each comprise upper and lower sheet metal surfaces 42 and 44 which converge aft to form the trailing edge of the blade. Herein the surfaces 42 and 44 are formed of a single piece of sheet metal bent around trailing edge strips of phenolic material 46 forming a trailing edge structure for the blade which is deformable within limits for the purpose of adjusting the pitching moment of the blade in a manner known in the art. The leading edges of surface sheets 42 and 44 are provided with mutually inwardly directed short flanges, or beads, 48 and 50 which are receivable in the kerfs 40 of spar member 10. It will be understood that the attaching surfaces 32 on the spar member are cut away just sufficiently to receive the metal surfaces 42 and 44 with a suitable adhesive between the latter and the spar member so that when the surface sheets 32 and 44 of the boxes are adhesively secured to the spar the surface sheets 32 and 44 will be flush with and form a smooth continuation of the airfoil contour of the spar member, as is clearly shown in Fig. 2. Any suitable adhesive may be used which will form a strong permanent bond between metal to metal surfaces.

Figures 3, 4:
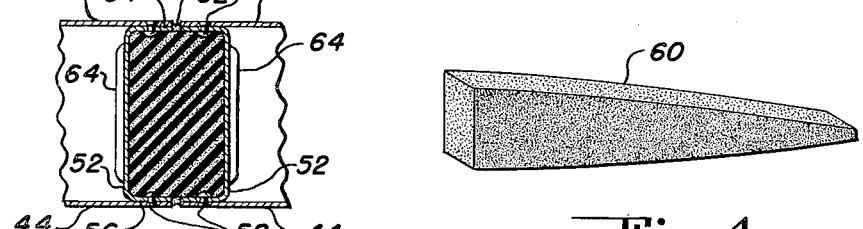
Fig. 3 is a sectional view on a still further enlarged scale taken on lines 3—3 of Fig. 1.
Fig. 4 is a detailed perspective view of a sealing member.

The boxes 36 are arranged in slightly spanwise spaced relation along the spar, as shown in Fig. 3 in order to permit flexibility of the blade in the plane of its rotation. Each box 36 is provided with two end closure plates 52 which, as shown most clearly in Fig. 3, have upper and lower flanges 54 and 56 which are secured to the upper and lower sheets 42 and 44 by rivets 58 along the chordwise ends of the boxes. It will also be noted from Fig. 3 that the flanges of the end closure plates of adjacent boxes are directed mutually toward one another so as to form complemental recesses in the ends of adjacent boxes for the purpose of receiving wedge-shaped sealing members 60 (Fig. 4), one of which occupies confronting recesses between each pair of adjacent boxes and completely fills these recesses. As shown herein, each sealing member 60 comprises a block of sponge rubber, but any other resilient cellular material could be used. By reason of the presence of sealing members 60 between adjacent boxes, the spaces 62 (Fig. 3) between these boxes are effectively sealed off so that no loss in efficiency occurs due to the passage of air through the blade between the boxes. The end closure plates 52 as herein shown are provided with stiffening dimples 64 and inturned flanges 66 at their forward edges which overlie the flat back 30 of the spar member and are adhesively secured thereto.

The trailing edge of the blade which is formed by the boxes 36 is faired into the spar at the root end of the blade by fairing member 38 previously mentioned. At the tip end of the blade a cap member 68 is provided for enclosing the end of the last box and the end of the spar, this cap member also serving to house a blade balancing mechanism now to be described.

Figures 5, 6:
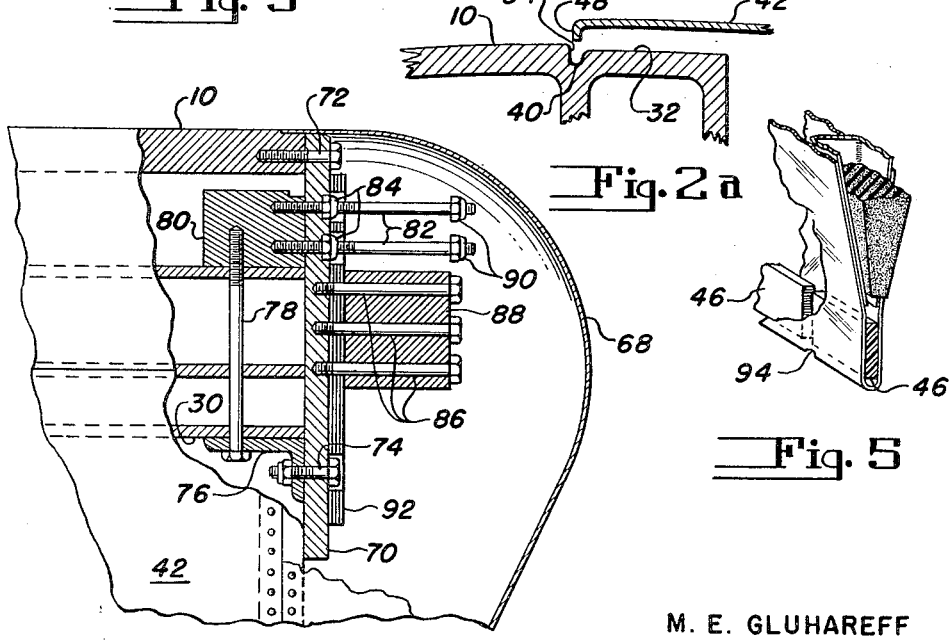
Fig. 5 is a detailed perspective view of a portion of the trailing edge of the blade, parts being broken away and parts being shown in section.
Fig. 6 is a partial sectional view very much enlarged of the tip portion of the blade shown in Fig. 1.

As shown in Fig. 6, a chordwise plate 70 is secured to the tip end of the spar member 10 by suitable fastening means. Herein cap screws 72 are threaded into the thickened nose portion 26, and bolts 74 secure the aft end of the plate to an angle member 76 which is fastened by a cap screw 78 to the flat back 30 of member 10. The bolt 78 is also threaded into a weight 80 located in the chamber 16 which is designed to balance the end cap 68. The weight 80 is like-wise secured to the plate 70 by studs 82 and nuts 84. It will be noted that the studs 82 and the three cap screws 86 are all arranged at equally spaced distances along the chordwise axis of the blade so that a weight 88 which has three spanwise apertures therein spaced apart by the same distance as the spacing between the studs 82 and the cap screws 86 can occupy various chordwise adjusted positions, the arrangement shown in Fig. 6 providing for three such chordwise positions of the weight 88. Additional positions may be provided for by drilling and tapping holes in plate 70. It will also be noted that the means for clamping the weight 88 in position also secures a weight 92 formed of laminated sheets of metal which is interposed between the weight 88 and the plate 70. By removing one or more of the laminations the spanwise balance of the blade can be varied to compensate for variation in manufacture of the blades so as to provide the same spanwise mass moment for the several blades which comprise a rotor.

In accordance with this invention the sheet metal boxes comprising the trailing edge portion of the blade are completely closed except for small bleed passages, one of which is shown at 94 in Fig. 5 in the extreme trailing edge of the blade. As illustrated in this figure, the blocks of phenolic material 46 are arranged so as to leave the openings 94 in communication with the interior of the metal boxes. Preferably two such bleed passages are provided for each box.

It will be evident that as a result of this invention an improved construction for an all metal blade of this type has been provided in which the metal boxes are secured to the spar member in an improved manner and in which these boxes are completely sealed off one from another by improved end plate members which also cooperate with the surface sheets of the boxes to form confronting recesses between the ends of adjacent boxes for the reception of resilient sealing means between boxes. It will also be noted that while these resilient sealing means prevent the downward passage of air through the spaces between the boxes the boxes are nevertheless free to move relative to each other in the chordwise plane of the blade as a result of bending of the spar member in the plane of rotation of the blade.

It will also be evident that by reason of the blade balancing mechanism provided it is possible to make the blades interchangeable and thus avoid the disadvantage of keeping the blades in matched sets which has hitherto been necessary. Thus if a blade becomes damaged, a new blade can be installed without the necessity of rebalancing the pitching moments and spanwise center of gravity location of all of the blades of the helicopter.

While only one embodiment of the invention has been shown herein by way of illustration, it will be evident that various changes may be made in the construction and arrangement of the parts without exceeding the scope of the present invention.

I claim:

1. A metal rotor blade for rotary wing aircraft comprising a spar member and a series of spanwise arranged sheet metal boxes having upper and lower surface sheets secured to the aft portion of said spar member and forming the airfoil contour of the blade aft of said spar member, said boxes being spaced spanwise from one another at least adjacent their trailing edges to permit said blade to bend in the plane of its rotation, and means for sealing off the spanwise space between each pair of adjacent boxes including a block of rubber-like material secured between the upper and lower sheets of said adjacent boxes and bridging the spanwise space therebetween.

2. A metal rotor blade for rotary wing aircraft comprising a spar member, and a series of spanwise arranged sheet metal boxes secured to said spar member forming the airfoil contour of the blade aft of said spar member, said boxes including spanwise aligned upper and lower surface sheets which are spaced spanwise from one another at least adjacent their trailing edges to permit said blade to flex in the plane of its rotation, and means for sealing off the spaces between adjacent boxes comprising blocks of rubber-like material carried by the ends of adjacent boxes and extending between said upper and lower sheets and bridging said spanwise spaces therebetween.

3. A metal rotor blade for rotary wing aircraft comprising a spar member having an external surface which defines a substantial portion of the airfoil contour of the blade, and a series of spanwise arranged sheet metal boxes secured to the aft portion of said spar member and completing the airfoil contour of the blade aft of said spar member, each of said boxes having upper and lower surface sheets which converge aft to form the trailing edge of the blade, and the several boxes being spaced apart spanwise at least adjacent their trailing edges to permit the blade to flex in the plane of its rotation, and means for sealing off the spaces between adjacent boxes including a wedge-shaped block of rubber-like material secured between the upper and lower sheets of adjacent boxes and bridging the spaces therebetween.

4. A metal rotor blade for rotary wing aircraft comprising a spar member having an external surface which defines a substantial portion of the airfoil contour of the blade, and a series of closed sheet metal boxes arranged spanwise along the aft edge of said spar member and completing the airfoil contour of the blade aft of said spar member, said spar member having trailing edge box attaching surfaces on its upper and lower faces terminating forwardly of the aft edge thereof in aft facing shoulders, and said boxes having upper and lower sheet metal surface members the leading portions of which overlie and are secured to the attaching surfaces on said spar member and abut said shoulders and channel shaped end walls having the webs thereof spaced inwardly from the end edges of the upper and lower surface members of said boxes to form confronting recesses at the ends of adjacent boxes.

5. A metal rotor blade for rotary wing aircraft having a spar member, and a series of closed metal boxes arranged in spaced relation spanwise along the aft edge of said spar member and cooperating with the latter to form a major portion of the blade profile, said spar member having trailing edge box attaching surfaces on its upper and lower faces terminating forward of the aft edges of said spar member in rearwardly facing shoulders, and said boxes having leading upper and lower surface portions which overlie and are secured to said attaching surfaces and abut said shoulders and channel shaped end walls having the webs thereof spaced inwardly from the ends of the upper and lower surface portions of said boxes to form confronting recesses at the ends of adjacent boxes, and means for bridging the spaces between adjacent boxes comprising a mass of resilient material occupying the confronting recesses at the ends of adjacent boxes.

6. A metal rotor blade for rotary wing aircraft comprising a spar member constituting the main strength member of the blade and having an external surface defining a substantial portion of the airfoil contour of the blade, and a series of sheet metal boxes arranged spanwise along and aft of said spar member completing the airfoil contour of the blade aft of said spar member, said boxes each comprising upper and lower surface sheets converging aft to form the trailing edge of the blade and end sheets forming end enclosures for said boxes, means for attaching the leading edge portions of said upper and lower sheets to said spar member, whereby the latter forms a front closure for said boxes, means for securing said end sheets to said surface sheets with the former spaced inwardly from the end edges of the latter to form confronting recesses at the ends of adjacent boxes, and resilient sealing means occuping the recesses between adjacent boxes and bridging the space between the ends of the surface sheets of adjacent boxes.

7. A metal rotor blade for rotary wing aircraft comprising a spar member constituting the main strength member of the blade, and a series of spaced sheet metal boxes arranged spanwise along and aft of said spar member completing the airfoil contour of the blade aft of said spar, said boxes each comprising upper and lower surface sheets converging aft to form the trailing edge of the blade and end sheets forming end enclosures for said boxes, means for attaching the leading edge portions of said upper and lower sheets to said spar member, said end closures comprising channel members having the flanges thereof secured to said upper and lower surface sheets with their webs spaced from the ends of said sheets to provide confronting recesses at the ends of adjacent boxes, and blocks of rubber-like material occupying confronting recesses of adjacent boxes and bridging the space between adjacent boxes.

8. A metal rotor blade for rotary wing aircraft comprising a spar member the external surface of which defines a substantial portion of the airfoil contour of the blade, a spanwise web on said spar adjacent the aft edge thereof, and a series of closed metal boxes arranged in a spanwise row along the aft edge of said spar member, each of said boxes being formed of sheet metal top and bottom plates converging aft to form the trailing edge of the blade and end plates forming end closures for said boxes, and means for securing the top, bottom and end plates of all of said boxes to said spar member whereby the spanwise web of the latter forms a common front closure for all of said boxes.

MICHAEL E. GLUHAREFF.

REFERENCES CITED

The following references are of record in the file of this patent:

UNITED STATES PATENTS

| Number | Name | Date |
|---|---|---|
| 2,276,004 | Vidal | Mar. 10, 1942 |
| 2,329,133 | Peed | Sept. 7, 1943 |
| 2,333,482 | Littman | Nov. 2, 1943 |
| 2,469,480 | Sikorsky | May 10, 1949 |
| 2,473,134 | Bonnett | June 14, 1949 |
| 2,482,936 | Renoux | Sept. 27, 1949 |
| 2,506,992 | Bucher | May 9, 1950 |

FOREIGN PATENTS

| Number | Country | Date |
|---|---|---|
| 789,671 | France | Aug. 26, 1935 |